3,261,768
METHOD OF PRODUCING LIGHT MODULATORS
Bryon J. Sabin, 36 Venezio Ave., Guilderland, N.Y.
No Drawing. Filed Aug. 5, 1965, Ser. No. 477,583
1 Claim. (Cl. 204—6)

This invention relates to—and has for its objects—the method of mass duplication of an original by production of same in transparent thermosetting or transparent thermoplastic material for use of the duplicated original as a light modulator. The original is of that class of material upon or within which a design, picture or work of art of the highest excellence is engraved by the creating artist. The duplicated original thusly has formed in its wall surface such design, picture or work of art. The light modulator, by modulating light from a source of illumination such as an electric light bulb, imposes the detail of the design, picture or work of art on the light from the source of illumination, thereby causing the detail to appear as a picture in illumination or etching in light. To accomplish this, light from the light source is directed at the edge of the transparent light modulator and through the transparent material in a direction approximately parallel to the wall surfaces one or both of which has been molded as described above to conform in reproduction to the original engraving. As the light enters the light modulator through one or more edges, almost none of the rays can impinge on the engraved wall surface or on its opposite wall surface at other than a very low angle of incidence so that the light is virtually entirely reflected and directed between the walls. Thus the light modulator performs as a wave guide, directing the light through the transparent light modulator and out the other edges. However, the surfaces of the marks and convolutions, which compose the engraved detail of the design, picture or work of art, are not parallel to the walls of the light modulator and, therefore, the light rays strike the surfaces of these details at high angles of incidence so that the rays are deflected by reflection toward the walls of the light modulator. In turn, the deflected rays strike the parallel walls of the light modulator at relatively high angles of incidence and can and do continue through to the outside. Since the rays emerging from the light modulator, through the walls, are substantially only those deflected by the surfaces forming the detail of the design, picture or work of art, the light is thus modulated to conform to the pattern making the design, picture or work of art appear as a picture in illumination or an etching in light. As examples, the light modulator can be utilized for esthetic appreciation of a religious motif or work of art, for an advertising display, for a television light, for a night light, etc. The created original is produced as light modulators by means of stamping, injection molding or cast molding. Plastic is the preferred choice of the material to be used in creating the original for the reason that same is easier to work with by the creating artist and same can be illuminated while being worked by the creating artist and thereby result in a high degree of correspondence with the final light modulators produced including the function of light modulation. This factor of functional correspondence of the original with the light modulators produced minimizes the error possibility of the artist creating the original.

This invention solves the problem of the art in the mass duplication of the original by producing light modulators whose detail will be of the greatest correspondence with the detail created in the original. The problem of mass duplication of which I speak is a possible numerical factor of producing in excess of 1,000,000 light modulators from one artistically created original. In solving this problem, successively formed from the original are a primary metal pattern plate, mold molding pattern plates and mold plates. One primary metal pattern plate is formed from the original in the method set forth herein and claimed. In forming primary metal pattern plates from the original the problem encountered of which I speak is that of successively greater deformation of the detail of the original and transference of this detail deformation to the successively formed primary metal pattern plates. Although five or six primary metal pattern plates can be successfully formed successively from the original, it is preferred to form only two or three primary metal pattern plates to minimize deformation of the detail of the original and transference of this detail deformation to the primary metal pattern plates. Although twelve mold molding pattern plates can be successfully formed successively from each of the mold molding pattern plates, it is preferred to form only six or eight mold plates from each one of the mold molding pattern plates to minimize this factor of successive detail deformation of the mold molding pattern plate and successive transference of this detail deformation to the mold plates. Each mold plate can be utilized to produce between 10,000 to 20,000 light modulators which will substantially correspond to the detail of the created original. This numerical production factor depends upon, in part, the extent of detail of the original to be produced in the light modulators and the technological excellence of technique employed in molding the light modulators. This accounts for the variables in the number of light modulators that can be successfully produced from the artistically created original. Hence, although the description of the method and the claims themselves are limited to forming only one primary metal pattern plate from the original, it is within the concept of this invention to form more than one primary metal pattern plate from the original to meet the situation of an encountered production problem of light modulators whether the problem is that of numerical quantity or whether the problem is that of the detail of the original and the technological technique of the molding.

In the first step in the method of this invention, the surface of the original is sprayed with an electroconductive material in solution such as silver nitrate. While the original is still wet from being sprayed with the silver nitrate solution, the original is introduced into a conventional electroplating bath where same is plated with nickel, copper, other suitable metals or alloys of same to a thickness varying from ten to fifty thousandths of an inch, but with a preferred working thickness varying from fifteen to twenty thousandths of an inch, thereby forming the primary metal pattern plate. This primary metal pattern plate is stripped from the original and cleaned to remove any residual film remaining on its surface. The reason for spraying the silver nitrate solution instead of applying same such as by brushing resides in the fact that the silver nitrate solution will thereby be more uniformly applied with the result that the formed primary metal pattern plate will complement substantially the surface detail of the original.

The next step is to successively form mold molding pattern plates from the primary metal pattern plate. The primary metal pattern plate is sprayed with a separating material such as potassium dichromate and, while wet, is introduced into a conventional electroplating bath where same is plated with nickel, copper, other suitable metals, or alloys of same to a thickness varying from ten to fifty thousandths of an inch, but with a preferred working thickness varying from fifteen to twenty thousandths of an inch, thereby forming a mold molding pattern plate. This mold molding pattern plate is stripped from the original and cleaned to remove any residual film remaining on its surface. This step is successively repeated to form additional required numbers of mold molding pattern plates.

The next step is to successively form mold plates from each of the formed mold molding pattern plates. One of the mold molding pattern plates is sprayed with a separating material such as potassium dichromate and, while wet, is introduced into a conventional electroplating bath where same is plated with nickel, copper, other suitable metals, or alloys of same to a thickness varying from ten to fifty thousandths of an inch, but with a preferred working thickness varying from fifteen to twenty thousandths of an inch, thereby forming a mold plate. This mold plate is stripped from the original and cleaned to remove any residual film remaining on its surface. This step is successively repeated to form additional required numbers of mold plates and this step is successively repeated with each one of the other mold molding pattern plates to form additional mold plates.

The reason stated for spraying the silver nitrate solution on the surface of the original applies also to the spraying of the potassium dichromate solution on the surfaces of the primary metal pattern plate and the mold molding pattern plates.

Each mold plate is utilized to produce the light modulators by stamping, injection molding or cast molding.

In stamping, each mold plate is utilized as a lamina and as such is affixed to a steel block. The mold plate is heated and sufficient force is utilized to impress the detail of the mold plate into the surface of transparent prepared sheets of thermoplastic such as styrene or acrylic to produce the light modulators.

Thermoplastic material is utilized for injection molding of the transparent light modulators, and either thermosetting or thermoplastic material is utilized for cast molding of the transparent or translucent light modulators.

In injection molding, each mold plate is utilized as a lamina and as such is affixed to a steel block forming a wall of the injection mold. The thermoplastic material is melted and introduced under pressure into the cavity of the injection mold to produce the light modulators.

In cast molding, each mold plate is utilized as a lamina and as such as affixed to a steel block forming a wall of the cast mold. The thermosetting or thermoplastic material, in melted condition, is introduced without pressure into the cavity of the cast mold to produce the light modulators.

Each mold plate can also be utilized to produce the light modulators by either straight compression molding or transfer compression molding. In straight compression molding, each mold plate is utilized as a lamina and as such is affixed to a steel block forming a wall of the compression mold. The thermosetting or thermoplastic material is placed in the mold cavity, and under pressure and at a range of temperature between 300° to 500° the material takes the form of the cavity thereby producing the light modulators. In transfer compression molding, each mold plate is utilized as a lamina and as such is affixed to a steel block forming a wall of the compression mold. The thermosetting or thermoplastic material is introduced into the transfer pot, and under pressure on a ram which closely fits the pot diameter, is transferred into the cavity. In the case of the thermosetting material, the high temperature range between 300° to 500° causes a reaction to take place, whereby the material solidifies thereby producing the light modulators. In the case of the thermoplastic material, the material is melted, transferred into the cavity, and then cooled to a solid state thereby producing the light modulators.

Although the invention has heretofore been described and discussed with reference to the mass duplication of light modulators, it is further within the concept and scope of this invention to produce, in contrast and comparison, a relatively small quantity of the light modulators. In this respect, one, two or three primary metal pattern plates are formed as previously described. These primary metal pattern plates as formed correspond to and are utilized as the final mold plates for quantity production ranging from 30,000 to 60,000 light modulators.

The claim terminology "electroforming" means the consecutive steps of electroplating and stripping.

Having thusly described my invention, I claim:

A method of producing plastic light modulators comprising creating an original for said light modulators, electroforming a primary metal pattern plate by electroplating said original, electroforming mold molding pattern plates by successive discrete electroplatings of said primary metal pattern plate, electroforming mold plates by successive discrete electroplatings of one of said mold molding pattern plates and utilizing one of said electroformed mold plates to mold up to 20,000 plastic light modulators.

References Cited by the Examiner

UNITED STATES PATENTS

| | | | |
|---|---|---|---|
| 2,327,762 | 8/1943 | Bull | 204—6 |
| 2,530,842 | 11/1950 | Ruggeri | 204—5 |
| 2,675,348 | 4/1954 | Greenspan | 204—5 |
| 2,758,961 | 8/1956 | Kosowsky | 204—5 |

JOHN H. MACK, *Primary Examiner.*

W. VAN SISE, *Assistant Examiner.*